(12) United States Patent
Vergote

(10) Patent No.: US 9,119,346 B2
(45) Date of Patent: Sep. 1, 2015

(54) EXTRACTOR APPARATUS AND SYSTEM FOR INTACT CROP RESIDUE COLLECTION AND DEPOSITION

(71) Applicant: CNH America LLC, New Holland, PA (US)

(72) Inventor: Geert Vergote, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 230 days.

(21) Appl. No.: 13/852,853

(22) Filed: Mar. 28, 2013

(65) Prior Publication Data

US 2014/0295923 A1 Oct. 2, 2014

(51) Int. Cl.
*A01F 12/44* (2006.01)
*B07B 1/50* (2006.01)
*B08B 5/00* (2006.01)
*A01D 45/10* (2006.01)

(52) U.S. Cl.
CPC ..................................... *A01D 45/10* (2013.01)

(58) Field of Classification Search
CPC ..... A01F 12/444; A01F 12/446; A01F 12/54; B65G 53/60; B65G 53/02; B65G 53/14; B01D 45/14; A01D 45/10
USPC ................ 460/99, 117, 80, 100, 98; 407/171; 209/11, 250, 393, 350; 55/406; 56/12.8
See application file for complete search history.

(56) References Cited

U.S. PATENT DOCUMENTS

| | | | | |
|---|---|---|---|---|
| 1,848,252 A | * | 3/1932 | Hermann | 460/117 |
| 1,854,954 A | * | 4/1932 | Pulz | 460/117 |
| 1,908,966 A | | 5/1933 | Falkiner et al. | |
| 3,002,585 A | * | 10/1961 | Pasturczak | 55/290 |
| 3,384,232 A | * | 5/1968 | Turnbull et al. | 209/11 |
| 3,387,442 A | * | 6/1968 | Henson | 56/328.1 |
| 3,397,778 A | * | 8/1968 | Karlsson | 209/23 |
| 3,664,349 A | * | 5/1972 | Quick | 460/99 |
| 3,788,048 A | * | 1/1974 | Stiff et al. | 55/406 |
| 3,925,199 A | | 12/1975 | Quick | |
| 3,946,875 A | * | 3/1976 | Fowler | 209/639 |
| 4,028,867 A | * | 6/1977 | Wolstenholme | 56/12.8 |
| 4,174,001 A | | 11/1979 | Ellis | |
| 4,235,293 A | | 11/1980 | Ellis | |
| 4,555,896 A | | 12/1985 | Stiff et al. | |
| 4,869,272 A | * | 9/1989 | Ricketts et al. | 460/100 |
| 5,088,960 A | * | 2/1992 | Stickler et al. | 460/80 |
| 5,317,783 A | * | 6/1994 | Williamson | 15/346 |
| 5,466,189 A | | 11/1995 | Deutsch et al. | |
| 6,029,430 A | | 2/2000 | Isfort et al. | |

(Continued)

FOREIGN PATENT DOCUMENTS

| | | | | | |
|---|---|---|---|---|---|
| FR | 2421685 A | * | 12/1979 | | B07B 4/00 |
| JP | 10276561 A | * | 10/1998 | | A01F 12/32 |

*Primary Examiner* — Árpád Fábián-Kovács
(74) *Attorney, Agent, or Firm* — Patrick M. Sheldrake; Seyed V. Sharifi T.

(57) ABSTRACT

A fan powered extractor system for a harvester, such as a sugarcane harvester, utilizes a rotary extractor screen larger than an air flow path to the fan, that moves through the air flow path such that the air flows through the screen to collect airborne leaves and other crop residue thereon, and carries them from the air flow and deposits them on the ground beside or behind the harvester or on another receiver without passing through the fan. The extractor screen can also pass through the exhaust air flow from the fan for blowing remaining collected residue therefrom, and the location of deposition of the leaves is optionally selectable.

29 Claims, 9 Drawing Sheets

(56) References Cited

U.S. PATENT DOCUMENTS

| | | | |
|---|---|---|---|
| 6,358,141 B1* | 3/2002 | Stukenholtz et al. | 460/100 |
| 6,558,252 B2* | 5/2003 | Visagie et al. | 460/99 |
| 6,634,833 B2* | 10/2003 | Gillespie | 406/84 |
| 6,796,897 B1* | 9/2004 | Lovett et al. | 460/99 |
| 6,869,356 B2 | 3/2005 | Hinds | |
| 7,981,175 B2 | 7/2011 | D'hondt | |
| 2002/0037758 A1* | 3/2002 | Visagie et al. | 460/99 |
| 2006/0283157 A1* | 12/2006 | Keys et al. | 55/290 |
| 2008/0016833 A1* | 1/2008 | Sheidler et al. | 55/385.3 |
| 2008/0038071 A1* | 2/2008 | Bodie et al. | 406/171 |
| 2008/0257531 A1* | 10/2008 | D'hondt et al. | 165/104.34 |
| 2009/0113867 A1* | 5/2009 | Birrell et al. | 56/13.3 |

* cited by examiner

EXTRACTOR APPARATUS AND SYSTEM FOR INTACT CROP RESIDUE COLLECTION AND DEPOSITION

TECHNICAL FIELD

The present invention generally relates to a fan powered extractor apparatus and system for a harvester, such as a sugarcane harvester, and, more particularly, that utilizes a rotary extractor screen larger than the air flow path to the fan, that moves through the air flow path to collect airborne leaves and other crop residue, and carries them from the air flow and deposits them largely intact on the ground beside or behind the harvester or on another receiver without passing through the fan. The extractor screen can also pass through the exhaust air flow from the fan for cleaning remaining residue therefrom, and the location relative to the harvester where the residue is deposited is optionally selectable.

BACKGROUND ART

Automated sugarcane harvesters are typically configured to sequentially sever standing canes from the ground, using one or more base cutters, and have processing apparatus including a conveyor or conveyors for carrying the cut canes rearward to a billet cutter for cutting into shorter billets. Sugarcane harvesters often also include apparatus for stripping or otherwise removing leaves from the cut canes, and one or more extractors for separating the leaves and other plant residue from the cut canes during the process. Typical extractors include a fan carried in a housing above one or more of the conveyors, configured to draw the leaves and other loose plant residue upwardly away from the heavier canes so that the canes continue on the conveyor or conveyors for additional processing or collection, and the leaves and other residue pass through the fan and are discharged with the fan exhaust, typically in a selectable direction by a directable fan hood or deflector disposed above the extractor fan housing. A disadvantage, however, is that the leaves and other residue pass through the fan which causes undesirable wear on the fan blades, and can occasionally wrap around the fan blades and/or possibly clog flow through the fan. Another disadvantage, for applications wherein it is desired for the leaves and other residue to remain largely intact, such as for collection for use as biomass or energy production, is that the fan will chop the leaves making them difficult or impossible to collect and use. It has also been observed that the residue that passes through the fan is more widely distributed over the field, which may not be desired if it is sought to collect it, e.g., for biomass. Reference in this regard, Wendte, et al., U.S. Pat. No. 6,272,819, which discloses and illustrates representative extractor apparatus of a sugarcane harvester.

As an alternative to passage through the extractor fan, it is contemplated according to the present invention to utilize a moving screen in front of the fan, to collect the residue flow toward the fan. A variety of moving screen apparatus have been developed in the past, but suffer from shortcomings. Reference in this regard, Ellis, U.S. Pat. No. 4,235,293 which discloses use of a moving scroll type screen for removing soil from a conveyed flow of potatoes. An observed limitation of this apparatus, however, is that the scroll encircles rollers above and below the entrance to the fan housing, and the scroll encircles the rollers so that the soil containing side of the scroll is facing the exposed fan, and soil deposits on the scroll not scraped off can be dislodged and drawn through the fan.

It is also known to locate rotary screens in the air intake path to heat exchangers, radiators, and the engine of work machines, including sugarcane harvesters. Reference in this regard, D'hondt U.S. Pat. No. 7,981,175. The D'hondt device provides a combination brush and blow-off capability for removing accumulated debris and residue from the rotary screen. However, a limitation is that it is used in association with a radially outwardly facing screen, and the blow-off apparatus covers a portion of the air flow path through the screen. This can be disadvantageous for high air flow applications such as the present extractor application wherein the screen is specifically intended to draw and collect a high volume of crop residue.

Accordingly, what is sought is a manner of adapting an extractor system of a harvester for reducing or eliminating passage of residue, namely, leaves, through the fan, to reduce wear and other attendant problems, and which overcomes one or more of the shortcomings and limitations set forth above.

SUMMARY OF THE INVENTION

What is disclosed is an extractor apparatus and system for a harvester for reducing or eliminating passage of residue, namely, leaves, through the extractor fan, to reduce wear and other attendant problems, and which overcomes one or more of the shortcomings and limitations set forth above.

According to a preferred aspect of the invention, for a harvester having a conveyor system for conveying harvested or cut crops and loose residue, the extractor system includes a fan disposed in a fan housing including an inlet opening disposed in spaced relation to apparatus of the conveyor system such that the inlet opening and the conveyor apparatus define ends of an air flow path therebetween. The system includes a rotary extractor screen larger than the air flow path and inlet opening, disposed in offset relation to the air flow path such that a limited portion of the extractor screen extends across the air flow such that the air flow will pass through the screen en route to the inlet opening, while a larger portion of the screen is located beside the air flow path out of the air flow.

Operationally, the extractor fan is rotatable to draw a flow of air from about a region of the conveyor system, along the air flow path and into the fan housing through the inlet opening, to carry at least some of the loose residue toward the fan. The air flow will pass through and into the inlet opening, but the airborne residue will strike and collect against the screen, held there by the force of the air flow, so as to be prevented from entering the fan housing. The larger portion of the screen, because it is not in the air flow, does not collect the residue. A drive is connected to and rotates the extractor screen across the air flow path such that the air flow passes through different of the portions of the screen during the rotation and collect residue, then carry it out of the path as they rotate away from the path, so as to remove the collected residue from the air flow. Once out of the air flow, the collected residue is no longer held against the screen, and is free to fall away onto a surface such as the ground therebelow, or into or on a desired receiver for collection.

According to another preferred aspect of the invention, a scraper is provided at a desired location along a path of rotation of the extractor screen, in position to scrape at least some of the collected residue therefrom once removed from the air flow. The scraper can be advantageously positioned for controlling to some extent, an end location bounding where the collected residue will fall from, so that a location where the residue falls to can be somewhat controlled or limited, e.g., a relatively narrow area beside the harvester.

As another preferred aspect of the invention, at least some of the air flow exhausted from the fan will be directed through the portion of the extractor screen beside the fan housing, in a direction opposite the direction through which the air flows entering the inlet opening, for dislodging and cleaning and remaining residue from the screen. This is preferably accomplished using an exhaust hood in connection with an exhaust opening of the fan housing.

As preferred parameters, the inlet opening and the extractor screen are both round, and the screen has an extent or surface area, that is about 4 times the size of the area of the air flow path and inlet opening. The extractor system can include an enclosed air flow passage extending from the conveyor system to the fan housing, and the extractor screen can extend and rotate through the slot into and out of the air flow path for collecting the residue.

DETAILED DESCRIPTION OF THE INVENTION

Figure 1:
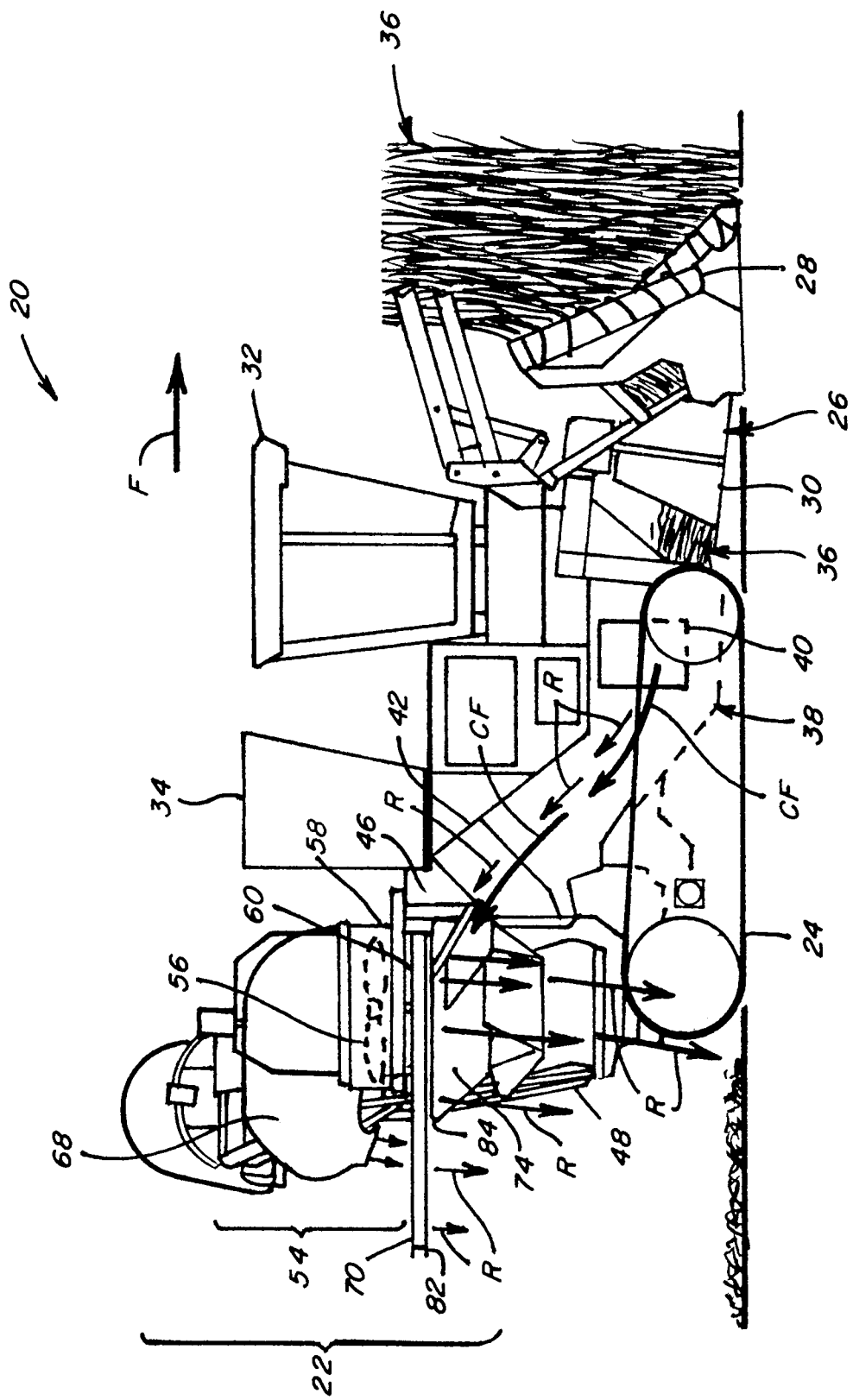
FIG. 1 is a simplified side view of a representative harvester including an extractor system according to the invention, showing harvesting of a crop with arrows showing crop flow through the harvester, extraction of crop residue, and deposition of the residue on the ground.
Figure 2:
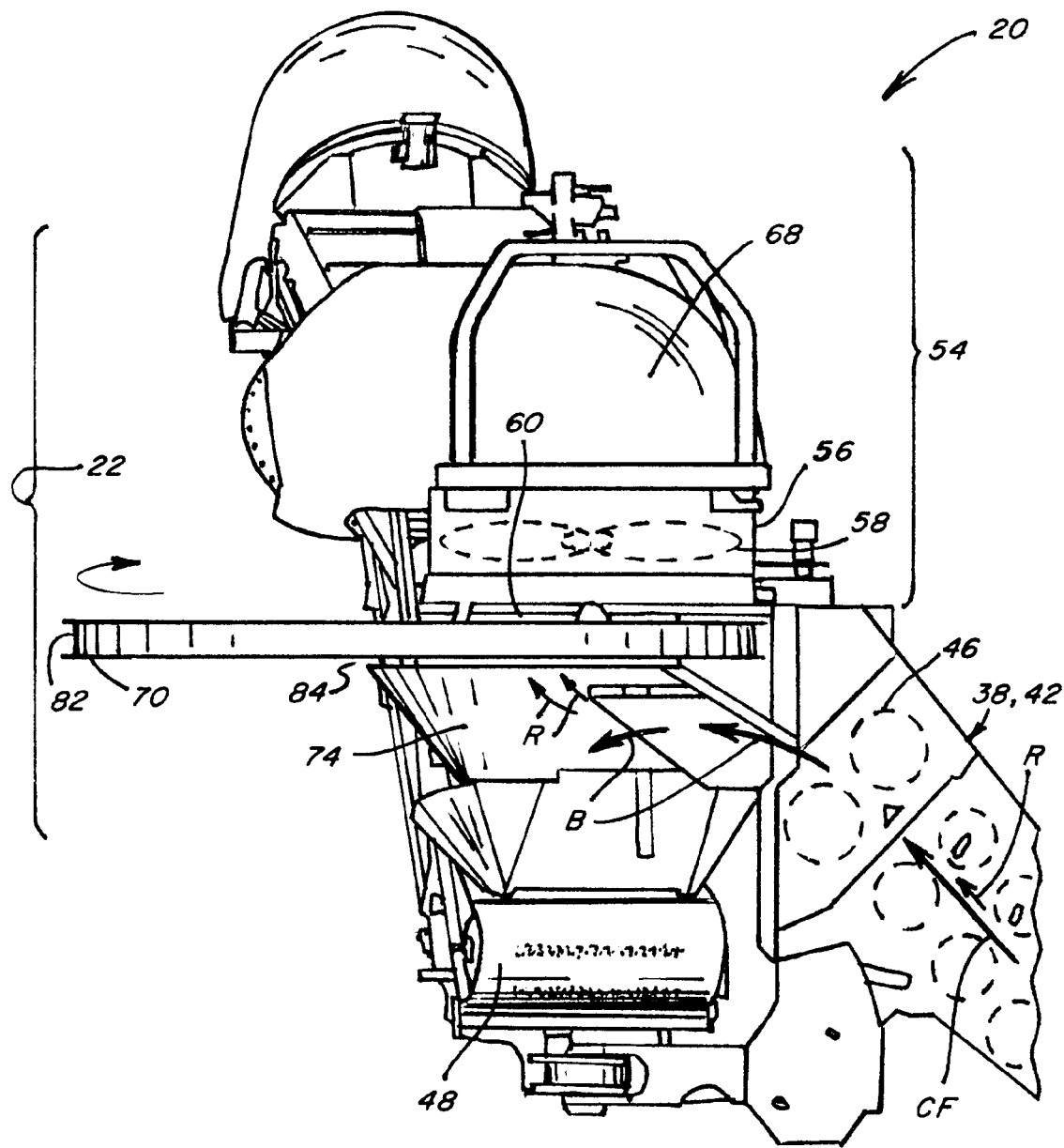
FIG. 2 is an enlarged fragmentary side view of the rear end of the harvester of FIG. 1, showing aspects of the extractor system.
Figure 3:
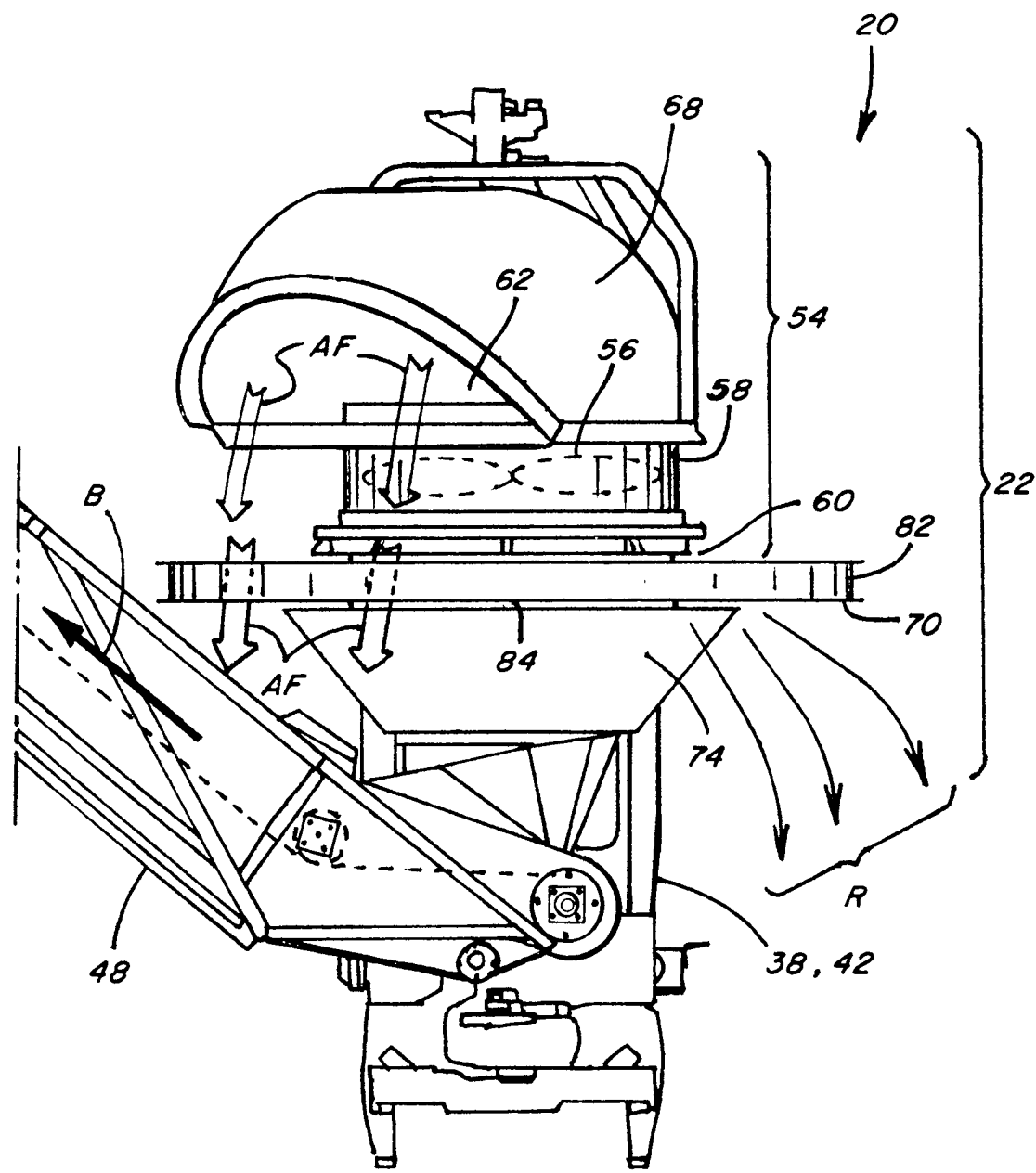
FIG. 3 is a fragmentary rear view of the harvester, showing aspects of the extractor system.

Referring now to the drawings, in FIG. 1, a representative harvester 20, which is a sugarcane harvester, is shown including an extractor system 22 constructed and operable according to the present invention. Harvester 20 is otherwise of conventional construction and operation, including tracks 24 and associated driveline for propelling harvester 20 over the ground; harvesting apparatus 26 including crop dividers 28 for gathering and separating a row or swath of plants to be cut from the ground from those not to be cut, base cutters 30 for cutting the plants from the ground, an operator cabin 32, a power plant 34 for powering the harvester, and other well known features. Reference in this regard, a complete sugarcane harvester of similar, well known construction shown and described in U.S. Pat. No. 6,272,819, incorporated herein in its entirety by reference.

In operation, standing plants 36 are gathered by dividers 28 as harvester 20 moves in a forward direction denoted by arrow F over ground surface G. Base cutters 30 then cut the gathered plants 36 from the ground and they are laid down onto a conveyor of a conveyor system 38 which carries the cut plants rearwardly through harvester 20, in a flow denoted by arrows CF. As a non-limiting reference, individual plants 36 can have a length of less than 1 meter, up to 3 to 4 meters. Sugarcane has relatively long leaves, and at some location or locations within the harvester, the leaves and other residue, hereinafter sometimes collectively referred as residue, will be removed or stripped from the cut plants 36, e.g., canes, by appropriate apparatus such as a conventionally constructed and operable rotary stripper apparatus 40, and in a loose state a flow of the residue, e.g., mainly leaves, denoted by arrows R, will intermix with and be carried rearwardly with the flow CF of cut plants 36 by conveyor system 38.

Figure 4:
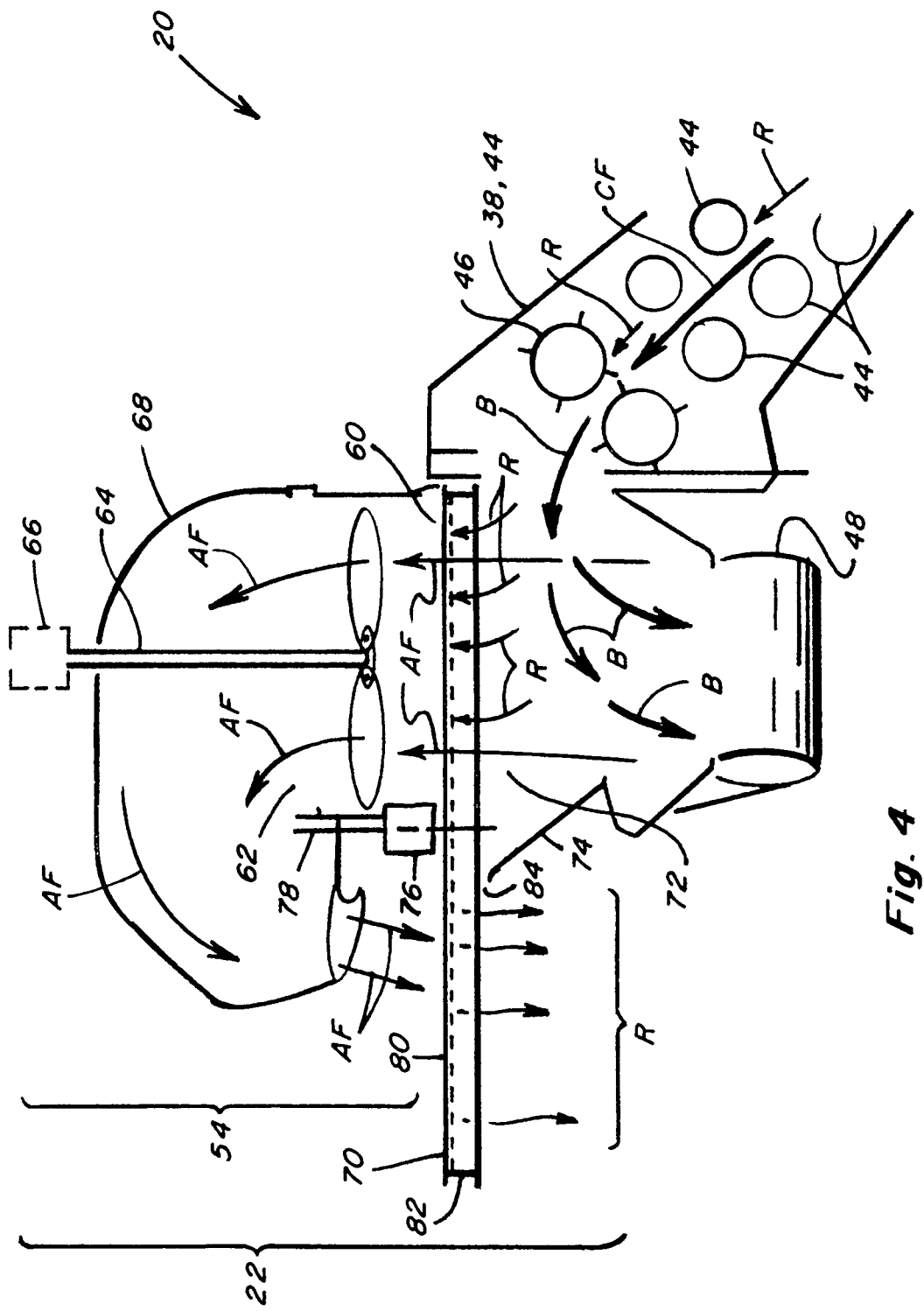
FIG. 4 is a simplified schematic side view of aspects of the harvester and extractor system.
Figure 5:
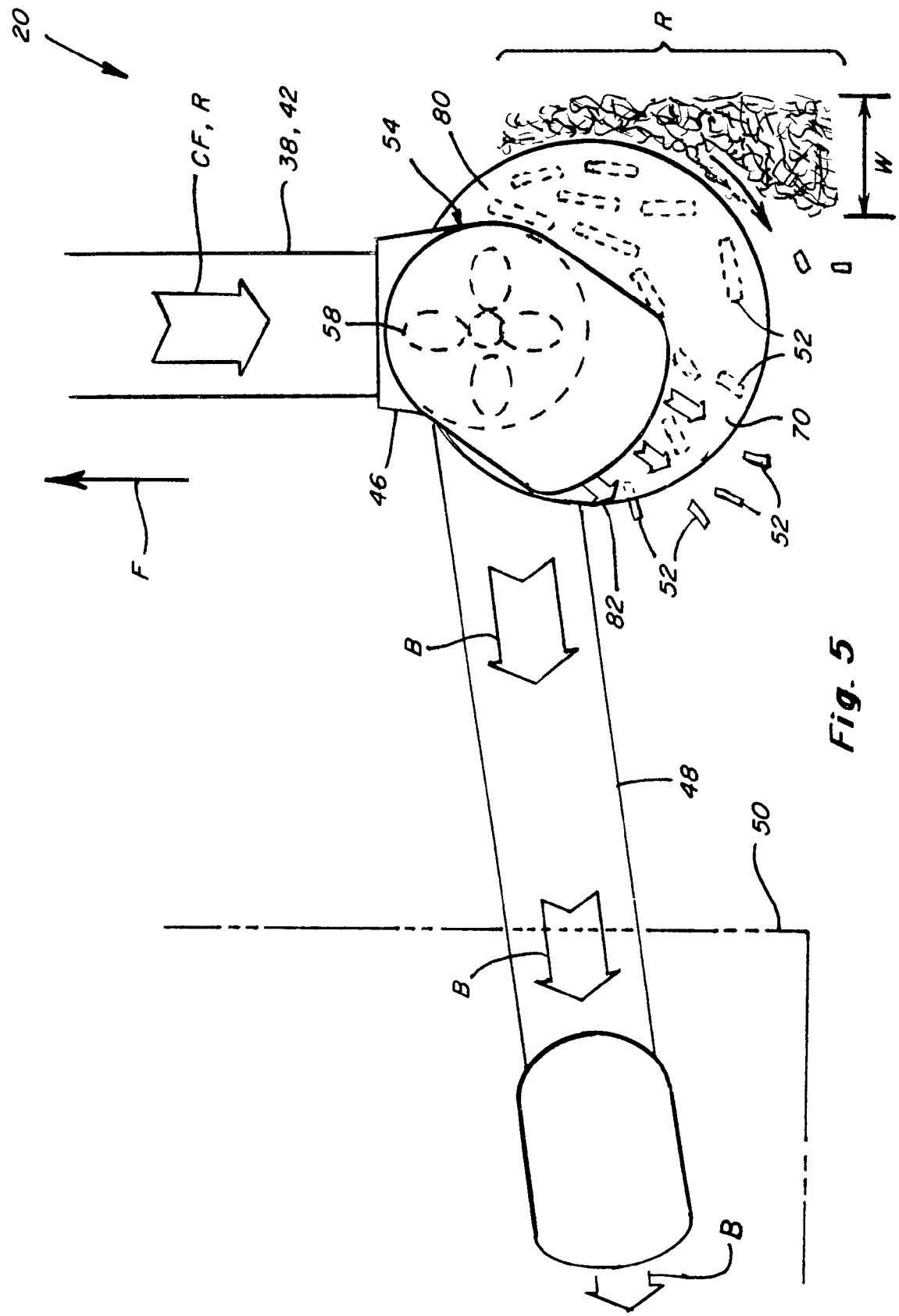
FIG. 5 is a simplified schematic top view of aspects of the harvester and extractor system, in one configuration for discharging crops on a first side of the harvester and depositing residue on a second side.
Figure 6:
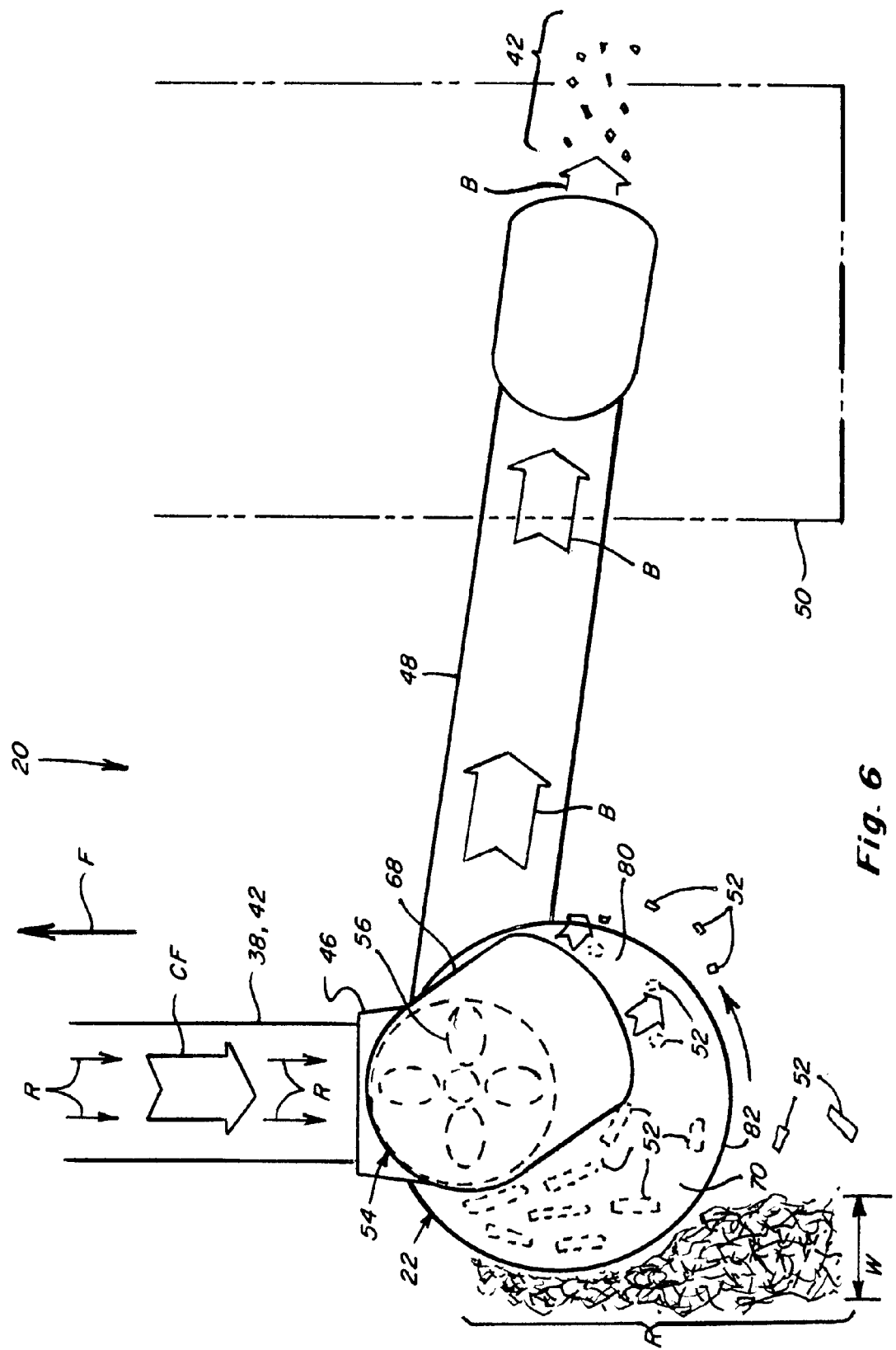
FIG. 6 is another simplified schematic top view of the aspects of the harvester and extractor system of FIG. 5, shown in an alternate configuration for discharging crops on the second side and depositing residue on the first side.

Referring variously also to FIGS. 2 through 7, it is typically desired to further cut the plants 36 into billets of a shorter length, e.g., one-fourth to one-half meter or less while still on harvester 20. To accomplish that, conveyor system 38 includes a lifting conveyor 42 which extends upwardly and rearwardly and includes a series of powered transfer rollers 44 rotatable for carrying cut plants 36 to a billet cutter 46 (FIGS. 4 through 7), conventionally constructed and operable for cutting the plants of flow CF into a flow of billets denoted by arrow B, and discharging the billet flow B airborne mixed with residue flow R. If undisturbed, the billet flow B and residue flow R would fall together onto an unloading conveyor 48 of system 38 extending upwardly from the rear of harvester 20, which would convey them upwardly and propel them from harvester 20, for example, airborne in a desired direction into an accompanying receiver 50 such as a truck or wagon (FIGS. 5 and 6). Unloading conveyor 48 is preferably pivotable at least side to side, so as to be positionable to extend to either side or to the rear, as desired, as variously illustrated in FIGS. 3, 5, and 6.

Instead of collecting the billets and residue together, it is usually desired to separate residue flow R, mainly leaves 52, from billet flow B so that only the billets 42 are collected in receiver 50 (FIG. 6). As discussed above, in the prior art this has been accomplished using a fan powered extractor or extractors, represented here by extractor 54, located at one or more suitable locations in association with the conveyor system 38, such as adjacent to the upper rear end of lifting conveyor 44 and billet cutter 46, particularly, where the just cut billet flow B and residue flow R are airborne en route to unloading conveyor 48. Extractor 54 uses the suction of its fan 56 to create an air flow AF that will lift at least a substantially portion of the loose residue flow R, the elements of which are sufficiently light so as to be liftable by air suction forces, from the billet flow B the billets 42 of which are generally too heavy to be lifted by the air suction generated by a typical extractor fan. In the known extractors, such as extractor 54 illustrated, the residue R passes with air flow AF through the extractor fan housing 58 containing fan 56, and is blown outwardly therefrom by the air flow, guided by a downwardly directed exhaust hood 68, in a broad swath on the ground, where the residue will eventually decompose (not shown). As noted above, the passage of the residue through the fan housing results in wear to the fan and possible clogging. The residue is also chopped by the fan to some extent, and is widely dispersed so as to be not easily recovered or collected if desired for use as biomass and the like.

Extractor system 22 overcomes the above problems by incorporating a residue collecting and deposition capability into a conventional extractor 54, which allows more precisely depositing the residue flow R in a swath or row having a controlled width W on the ground in desired relation to harvester 20 (FIGS. 5 and 6), or into an accompanying receiver (not shown). Conventional elements of extractor system 22 include the fan 56 and fan housing 58 which has a downwardly facing inlet opening 60 into which air flow AF is drawn, and an upwardly facing exhaust opening 62 through which it is exhausted, as illustrated. Fan 56 here is suspended in housing 58 above opening 60 by a drive shaft 64, which is connected in rotatably driven relation to a drive 66 which can comprise, for instance, a conventional fluid motor, electric motor, belt or fan drive, operable for rotating fan 56 within housing 58 in the well known manner. Drive 66 is disposed in or above exhaust hood 68 located above fan housing 58. Exhaust hood 68 overlays exhaust opening 62, is configured to direct the exhausted air flow AF from fan housing 58 downwardly and outwardly away from harvester 20, and is preferably mounted so as to be pivotable or rotatable, for directing the exhausted air flow AF in a desired direction.

Figure 7:
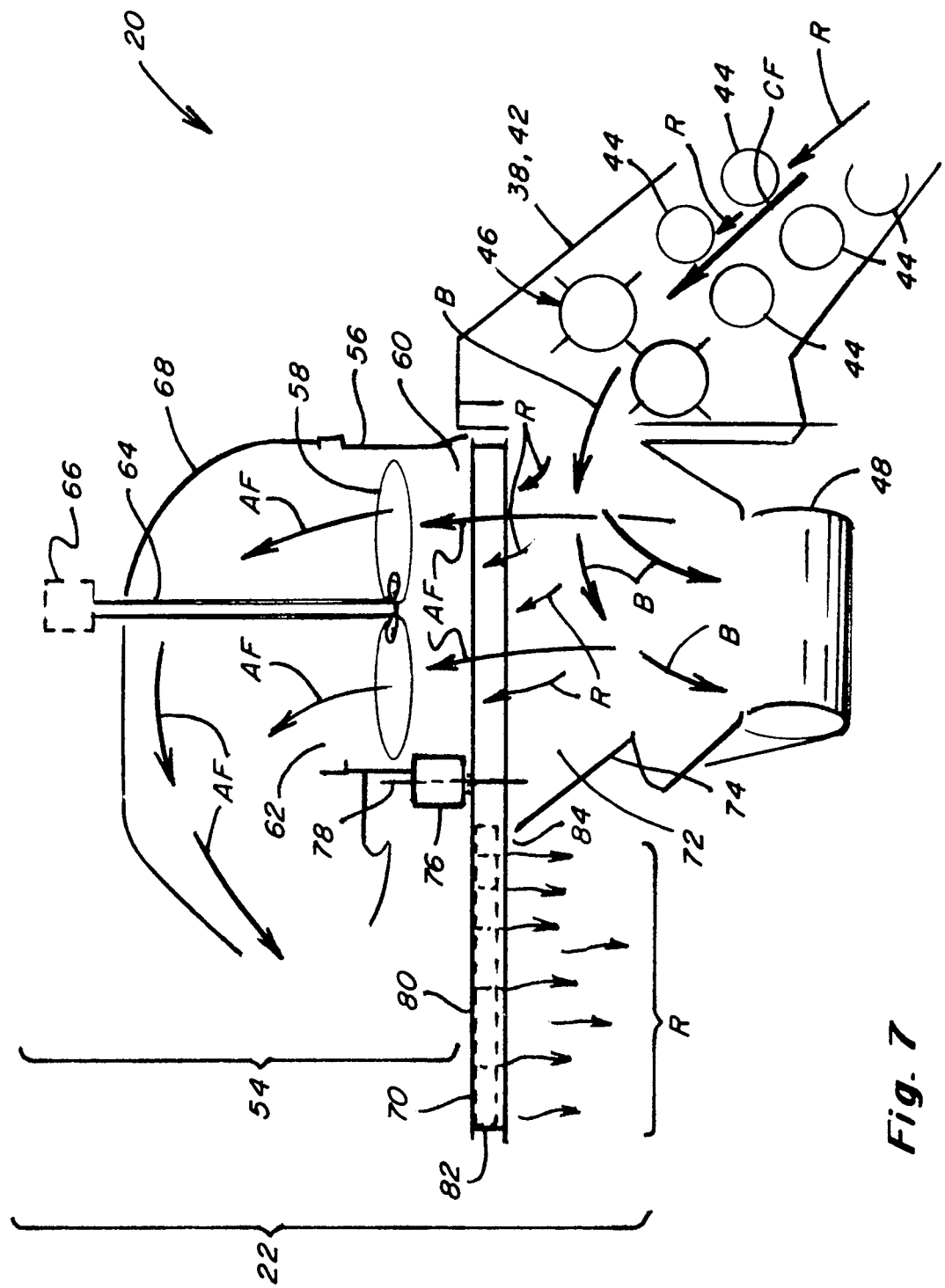
FIG. 7 is another simplified schematic side view of aspects of the harvester and extractor system.

Extractor system 22 additionally importantly includes a rotary extractor screen 70 which is larger than inlet opening 60 of fan housing 58, and also an air flow path 72 extending from the outlet of billet cutter 46 on the upper rear end of lifting conveyor 42, to opening 60, as shown in FIGS. 4 and 7. Air flow path 72 is located above the lower end of unloading conveyor 48, so as to encompass the space into which the billet flow B and residue flow R pass when discharged from billet cutter 46, from which air flow AF is generated. Preferably, air flow path 72 is bounded and enclosed by an air flow housing 74, shown here having a partial conical or tapered shape that extends convergingly downwardly from extractor screen 70 to just above the lower end of unloading conveyor 48, for containing air flow AF and also guiding the downward flow B of billets from billet cutter 46 to conveyor 48. Extractor screen 70 is supported in offset relation to air flow path 72, such that a limited portion of screen 70 extends across and occupies air flow path 72 such that air flow AF generated by fan 56 will pass through screen 70 en route to inlet opening 60, while a larger portion of screen 70 is located beside air flow path 72 and housing 56, out of air flow AF. Extractor screen 70 is supported by a rotary drive 76 (FIGS. 4 and 7), which can be a conventional fluid motor, electric motor, belt or fan drive, or the like, operable for rotating screen 70 about a rotational axis 78, such that the portion of screen 70 in the air flow path 72 changes and successive portions of the screen surface are moved through air flow AF for collection of the residue in a continually renewing manner so as to maintain adequate air flow and avoid clogging or performance reduction. Preferably in this regard, the rotation is continuous so that the portion of screen 70 through which the air flows into inlet opening 60 changes continuously in a manner to avoid clogging or buildup of residue that would impair rotation or cause residue to fall from the screen within housing 74. The speed of rotation can be constant, or variable as desired or required for achieving desired residue collection and deposition.

Extractor screen 70 is preferably generally or substantially flat and round shaped, and has a screen surface 80 supported by an outer frame 82. Screen surface 80 includes perforations or interstices therethrough for the passage of air flow AF, but not leaves 52 and other elements of residue flow R. A suitable material for screen surface 80 is a woven screen wire of metal or fiber construction. Preferably, extractor screen 70 extends through a slot 84 in air flow housing 74; at an interface of the upper portion of housing 74 and fan housing 58; or in housing 58, so as to be located just below fan 56, so that adequate suction is generated on the underside of the portion of screen surface 80 located in air flow path 72, by air flow AF for collecting and holding leaves and other elements of the residue flow R against the underside of surface 80, as denoted by small arrows R in FIGS. 4 and 7.

As a non-limiting example, screen surface 80 of screen 72 will have an overall size several times greater than the overall size of air flow path 72 proximate thereto, and also inlet opening 60 also proximate thereto. A size of about 4 times greater as illustrated, has been found to be satisfactory for a variety of applications. Here, because both screen 72 and inlet opening 60 are round, a suitable diametrical size of screen 72 is a about two or more times the diameter of air flow path 72 and inlet opening 60. Additionally the offset relation of the screen 72 to path 72 and inlet opening 60 can be set such that the round screen and inlet opening are generally or tangent. This is advantageous as all of the inlet opening will lie on one side of rotational axis 78 of the screen.

As a result of the configuration of system 22, operationally, rotation of fan 56 draws air flow AF along air flow path 72, through surface 80 of screen 70, and into fan housing 58 through inlet opening 60. Airborne residue R will be carried by air flow AF so as to impinge screen surface 80, and collect and be held thereagainst by the air flow. Then, because of the rotation of screen 70, the collected residue R will be carried by screen 70 from air flow path 72 through slot 84 to the exterior of air flow housing 74 generally beside and rearward of the rear end of harvester 20. Now out of the air flow that held the residue against screen 70, residue R is free to fall from screen 70 onto the ground as illustrated, or onto a desired receiver positioned therebelow (not shown). Because it is not blown out of exhaust hood 68 by fan 56, and instead falls from a lower location, the residue R tends to collect in a relatively narrow, dense row having a width W which can vary between less than a meter to less than two meters, so as to be easily capable of being picked up by a baler rake or the like, for use for a desired purpose, e.g., biomass.

Figure 8:
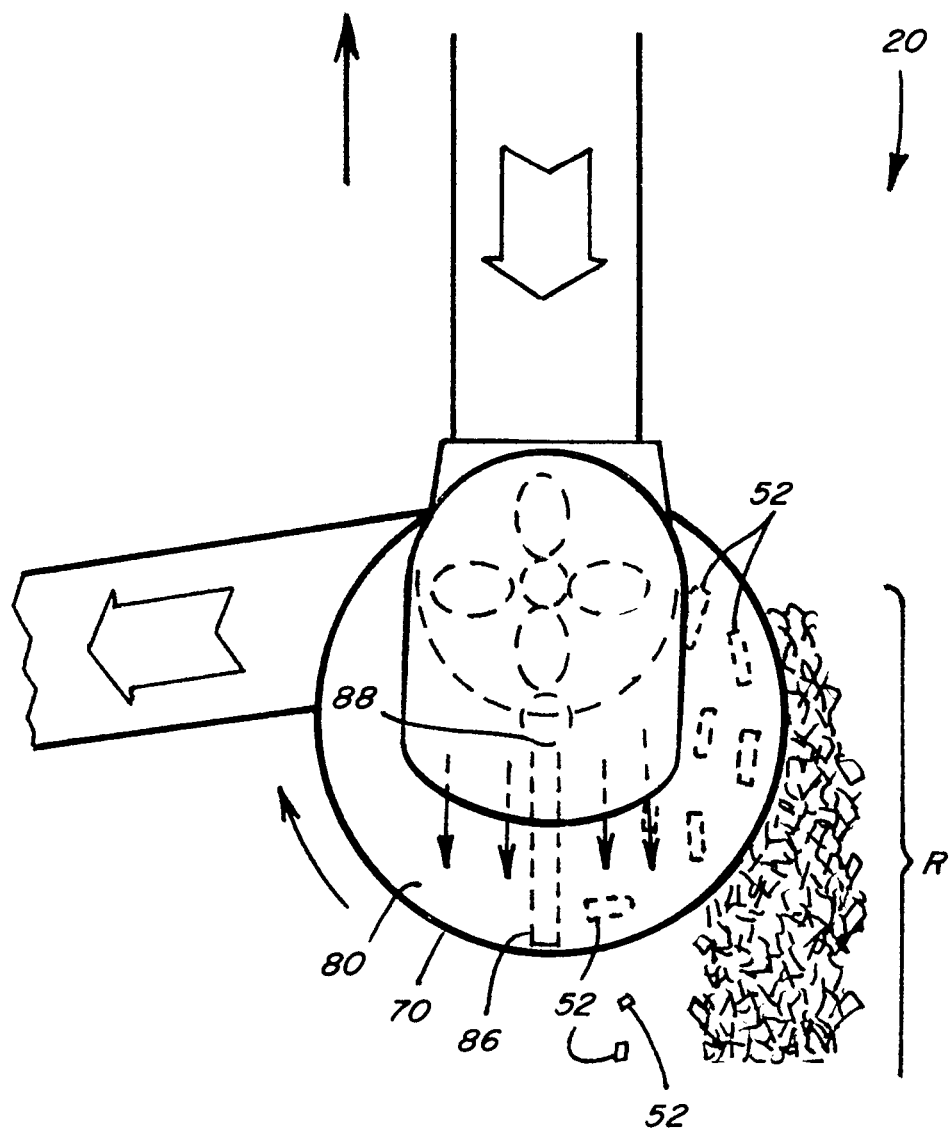
FIG. 8 is another simplified schematic top view of aspects of the harvester and extractor system, showing an optional scraper.
Figure 9:
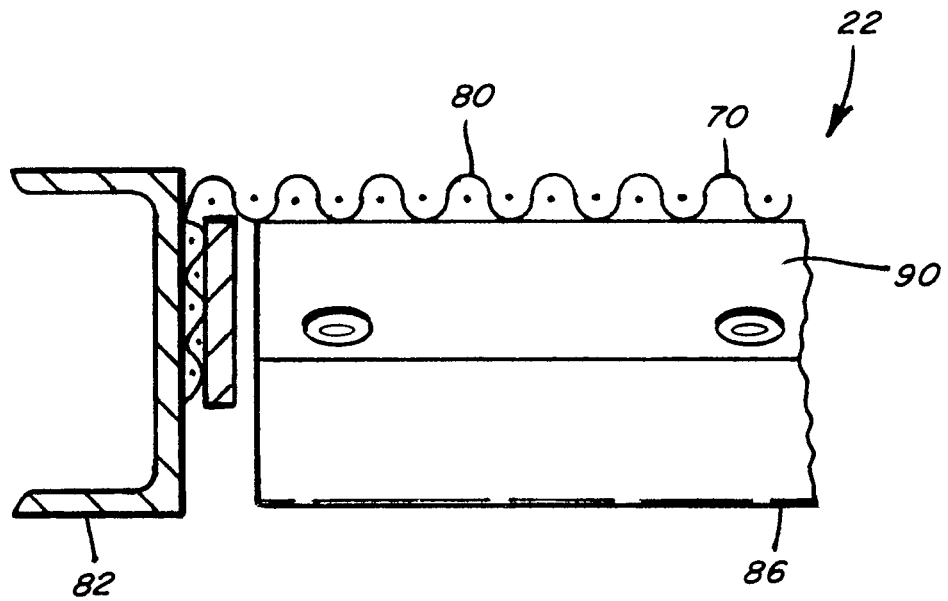
FIG. 9 is a simplified fragmentary side view of aspects of the extractor system and scraper of FIG. 8.
Figure 10:
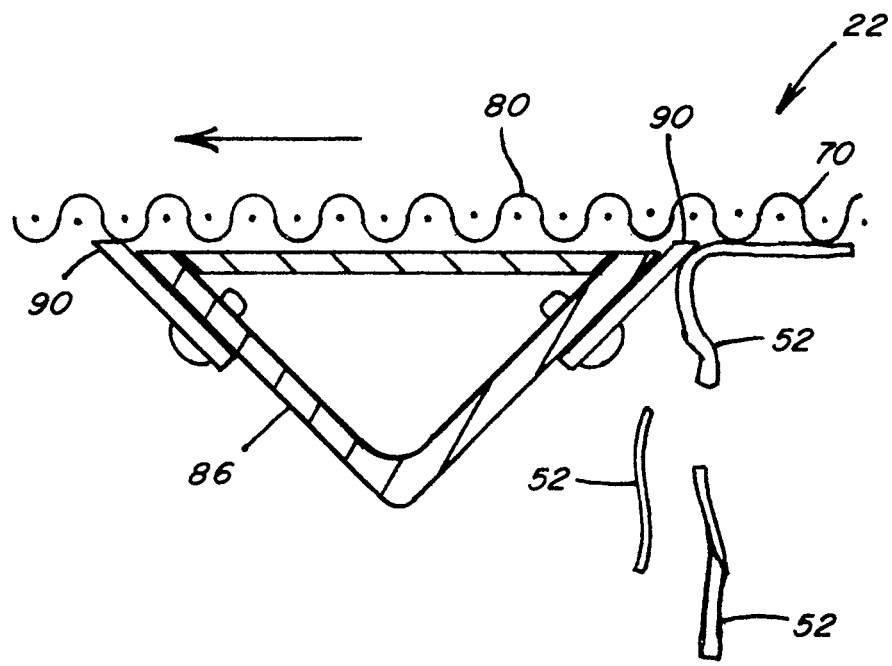
FIG. 10 is a simplified fragmentary side view of the aspects of the extractor system of FIG. 9, showing the scraper in section.

Referring also to FIGS. 8, 9, and 10, system 22 of harvester 20 additionally preferably includes a scraper 86 at a desired location along a path of rotation of extractor screen 70, here, a rearward location, in position to scrape at least some of the collected residue from the underside of screen surface 80, namely remaining leaves 52 still attached or lodged thereagainst, once removed from the air flow. If desired or needed, the location of scraper 86 can be selected for controlling to some extent, a side bounds of where residue R will fall from, so that a location where the residue falls to can be somewhat controlled or limited, e.g., a relatively narrow area beside harvester 20 as illustrated. Scraper 86 can be supported in any suitable manner in close proximity to the underside of screen surface 80, such as in a cantilever manner from a support 88 located close to the center of screen 70 so as to extend radially outwardly to adjacent to outer frame 82. Scraper 86 is illustrated as having a wedge shape, and can have replaceable blades 90 along the upper edges thereof for butting against screen surface 80 to facilitate cleaning, if desired.

Referring again to FIGS. 3, 4, and 7, as an additional cleaning feature, exhaust hood 68 can be configured so as to direct a portion of the exhausted air flow AF downwardly through a portion of screen 70, in the opposite direction to the upward flow therethrough, and externally of fan housing 58 and air flow housing 74, as illustrated by arrows AF, for dislodging attached leaves and other residue before that portion of the screen reenters air flow path 72.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An extractor for a harvester having a conveyor system for conveying cut crops and loose residue, comprising:
    a fan disposed in a fan housing including an inlet opening and an exhaust opening, the inlet opening disposed in spaced relation to the conveyor system such that the inlet opening and the conveyor system bound ends of an air flow path therebetween, the air flowing through the inlet opening into the direction of the exhaust opening; and
    a rotary extractor screen having a rotational axis including a drive connected in rotatably driving relation to the extractor screen to rotate the screen through the air flow path such that the air flow will pass through successive portions of the screen, the extractor screen having a larger surface area than a sectional extent of the air flow path, the rotational axis disposed in offset relation thereto such that a portion of the extractor screen covers the air flow path such that the air flow along the path will pass therethrough and into the inlet opening, while a larger portion of the screen is located beside the air flow path.

2. The extractor of claim 1, wherein the rotational axis is generally parallel to and beside the air flow path.

3. The extractor of claim 1, wherein the surface area of the extractor screen is at least 4 times greater than the sectional extent of the air flow path.

4. The extractor of claim 1, wherein the air flow path and the extractor screen have round shapes, respectively.

5. The extractor of claim 4, wherein the inlet opening and the extractor screen have generally tangent edges.

6. The extractor of claim 1, wherein the inlet opening and the extractor screen are at least generally flat and parallel.

7. The extractor of claim 4, wherein the inlet opening has a diametrical extent of about one-half of a diametrical extent of the extractor screen.

8. The extractor of claim 1, further comprising an air flow housing disposed about the air flow path between the conveyor system and the extractor screen.

9. The extractor of claim 8, wherein the portion of the extractor covering the inlet opening is disposed in a slot between the fan housing and the air flow housing.

10. The extractor of claim 1, wherein the extractor further includes an exhaust hood in connection with the exhaust opening configured for directing at least a portion of the exhausted air flow beside the fan housing, and at least a portion of the larger portion of the extractor screen is located in an exhaust air flow path from the exhaust hood.

11. The extractor of claim 1, wherein the extractor fan, the extractor screen and the drive comprise an extractor system configured to operate to draw an air flow from the conveyor system along the air flow path through the portion of the extractor screen and the inlet opening into the fan housing, to carry an airborne flow of the residue from the conveyor system against the extractor screen so as to collect and be carried thereby from the air flow, and such that when out of the air flow the collected residue will fall from the extractor screen onto a surface or receiver therebelow.

12. The extractor of claim 1, including a scraper disposed beside the fan housing configured to scrape the collected residue from the extractor screen.

13. The extractor of claim 1, wherein the harvester is a sugar cane harvester, the conveyor system including a lifting conveyor extending upwardly and rearwardly for carrying cut plants to a billet cutter and an unload conveyor, the extractor being placed above said unload conveyor to carry an airborne flow of the residue from the conveyor system against the extractor screen.

14. An extractor system for a harvester having a conveyor system for conveying cut crops and loose residue, comprising:
    a fan disposed in a fan housing including an inlet opening and an exhaust opening, the inlet opening disposed in spaced relation to the conveyor system such that the inlet opening and the conveyor system bound ends of an air flow path therebetween, the fan being rotatable to draw a flow of air from about the conveyor system, along the air flow path and into the fan housing through the inlet opening towards the exhaust opening, to carry at least some of the loose residue toward the fan;
    a rotary extractor screen having a rotational axis and being larger than the inlet opening, the rotational axis being disposed in offset relation to the air flow path such that a portion of the extractor screen covers the air flow path such that the air flow will pass therethrough, while a larger portion of the screen is located beside the air flow path, such that the loose residue carried by the air flow will collect on the screen and be held thereagainst by the air flow; and
    a drive connected in rotatably driving relation to the extractor screen, operable to rotate the screen through the flow path such that different of the portions of the screen successively cover the path and the residue will be collected thereon and be carried thereby from the air flow so as to fall from the screen when out of the air flow.

15. The extractor system of claim 14, wherein the extractor screen has an overall size at least 4 times the size of the inlet opening.

16. The extractor system of claim 14, wherein the inlet opening and the extractor screen have round shapes, respectively.

17. The extractor system of claim 16, wherein the inlet opening and the extractor screen are generally tangent.

18. The extractor system of claim 14, wherein the inlet opening and the extractor screen are at least generally flat and parallel.

19. The extractor system of claim 14, wherein the fan housing defines an exhaust opening for exhausting the air flow, the extractor further includes an exhaust hood in connection with the exhaust opening configured for directing at least a portion of the exhausted air flow beside the fan housing, and at least a portion of the larger portion of the extractor screen beside the inlet opening is located in an exhaust air flow path from the exhaust hood so that the exhausted air flow will pass therethrough for blowing remaining collected residue therefrom.

20. The extractor system of claim 14, further comprising a scraper disposed beside the fan housing configured to scrape remaining collected residue from the extractor screen when rotating.

21. The extractor system of claim 14, further comprising an air flow housing disposed about the air flow path between the conveyor system and the extractor screen.

22. The extractor system of claim 21, wherein the portion of the extractor screen covering the air flow path is disposed in a slot proximate the inlet opening.

23. The extractor system of claim 14, wherein the harvester is a sugar cane harvester, the conveyor system including a lifting conveyor extending upwardly and rearwardly for carrying cut plants to a billet cutter and an unload conveyor, the extractor system being placed above said unload conveyor to carry an airborne flow of the residue from the conveyor system against the extractor screen.

24. An extractor system for removing loose leaves from harvested crops conveyed by a harvester, comprising:
   a fan disposed in a fan housing disposed above conveyor apparatus of the harvester, the fan housing including a downwardly facing inlet opening and an exhaust opening, the inlet opening having an overall opening size, the fan and the housing being configured such that rotation of the fan will generate an upward air flow into the housing through the inlet opening towards the exhaust opening sufficient for lifting the loose leaves from the harvested crop and; and
   a rotary extractor screen having a rotational axis including a drive connected in rotatably driving relation to the extractor screen, the extractor screen including a generally flat screen surface having an overall surface area at least several times larger than the overall opening size of the inlet opening, the rotational axis of the extractor screen being located in offset relation to the inlet opening such that only a limited portion of the screen surface is located between the conveyor apparatus and the inlet opening such the air flow will pass through the limited portion and the lifted loose leaves will be collected and held thereagainst by the air flow, and wherein rotation of the screen will move the limited portion of the screen surface from the air flow such that the collected leaves will fall therefrom, and simultaneously another limited portion of the screen surface will rotate into the air flow for collection of the leaves thereagainst.

25. The extractor system of claim 24, wherein the screen surface of the extractor screen has a round shape.

26. The extractor system of claim 24, wherein the overall surface area is about 4 times larger than the overall opening size.

27. The extractor system of claim 24, wherein the exhaust opening of the fan housing has an element configured for discharging the air flow against another portion of the screen surface.

28. The extractor system of claim 24, including a scraper disposed for scraping the leaves from the screen surface after leaving the air flow.

29. The extractor system of claim 24, wherein the harvester is a sugar cane harvester, the conveyor system including a lifting conveyor extending upwardly and rearwardly for carrying cut plants to a billet cutter and an unload conveyor, the extractor system being placed above said unload conveyor to carry an airborne flow of the leaves from the conveyor system against the extractor screen.

\* \* \* \* \*